(12) United States Patent
Ryu et al.

(10) Patent No.: US 11,505,624 B2
(45) Date of Patent: Nov. 22, 2022

(54) RUBBER COMPOSITION

(71) Applicant: LG Chem, Ltd., Seoul (KR)

(72) Inventors: Jin Sook Ryu, Daejeon (KR); Kyoung Hwan Oh, Daejeon (KR); Woo Jin Cho, Daejeon (KR); Suk Youn Kang, Daejeon (KR); Sung Joon Oh, Daejeon (KR); Sun Ok Oh, Daejeon (KR)

(73) Assignee: LG Chem, Ltd.

( * ) Notice: Subject to any disclaimer, the term of this patent is extended or adjusted under 35 U.S.C. 154(b) by 284 days.

(21) Appl. No.: 16/634,268

(22) PCT Filed: Sep. 20, 2018

(86) PCT No.: PCT/KR2018/011189
§ 371 (c)(1),
(2) Date: Jan. 27, 2020

(87) PCT Pub. No.: WO2019/066396
PCT Pub. Date: Apr. 4, 2019

(65) Prior Publication Data
US 2020/0377625 A1 Dec. 3, 2020

(30) Foreign Application Priority Data

Sep. 29, 2017 (KR) ............ 10-2017-0126963
Sep. 19, 2018 (KR) ............ 10-2018-0112092

(51) Int. Cl.
*C08C 19/25* (2006.01)
*C08F 4/52* (2006.01)

(52) U.S. Cl.
CPC ........... *C08C 19/25* (2013.01); *C08F 4/52* (2013.01)

(58) Field of Classification Search
CPC .................. C08C 19/25; C08F 4/52
See application file for complete search history.

(56) References Cited

U.S. PATENT DOCUMENTS

| | | | |
|---|---|---|---|
| 6,187,595 | B1 | 2/2001 | Staal |
| 10,928,368 | B2 | 2/2021 | Choi et al. |
| 2009/0099325 | A1 | 4/2009 | Luo et al. |
| 2010/0004414 | A1 | 1/2010 | Luo |
| 2010/0160530 | A1 | 6/2010 | Kurazumi et al. |
| 2011/0152449 | A1 | 6/2011 | Luo |
| 2011/0288200 | A1 | 11/2011 | Luo |
| 2012/0130009 | A1 | 5/2012 | Qin et al. |
| 2012/0136113 | A1 | 5/2012 | Yan et al. |
| 2012/0309906 | A1 | 12/2012 | Hogan et al. |
| 2013/0035437 | A1* | 2/2013 | Pan .............. C08K 3/36 524/572 |
| 2014/0243476 | A1 | 8/2014 | Lee et al. |
| 2016/0053059 | A1 | 2/2016 | Kim et al. |
| 2017/0002112 | A1 | 1/2017 | Luo |
| 2018/0030173 | A1 | 2/2018 | Kang et al. |
| 2018/0030174 | A1 | 2/2018 | Kang et al. |
| 2018/0066076 | A1* | 3/2018 | Kyo ................ C08K 3/013 |
| 2018/0305470 | A1 | 10/2018 | Lee et al. |
| 2018/0328901 | A1 | 11/2018 | Choi et al. |

FOREIGN PATENT DOCUMENTS

| | | |
|---|---|---|
| CN | 102361888 A | 2/2012 |
| CN | 103183778 A | 7/2013 |
| CN | 107466299 A | 12/2017 |
| CN | 107923891 A | 4/2018 |
| EP | 3222639 A1 | 9/2017 |
| JP | H09510290 A | 10/1997 |
| JP | 2006003265 A | 1/2006 |
| JP | 2012532227 A | 12/2012 |
| JP | 2012532230 A | 12/2012 |
| JP | 5698560 B2 | 4/2015 |
| JP | 2017002189 A | 1/2017 |
| JP | 2018526628 A | 9/2018 |
| KR | 20080092378 A | 10/2008 |
| KR | 20170000755 A | 1/2017 |
| KR | 20170074681 A | 6/2017 |
| KR | 20170076570 A | 7/2017 |

OTHER PUBLICATIONS

Chinese Search Report for Application No. 201880049054.3, dated Jul. 6, 2021, 2 pages.
Cools et al., "Determination of the chemical composition distribution of copolymers of styrene and butadiene by gradient polymer elution chromatography", Journal of Chromatography A, vol. 736, Issue 1-2, Jun. 1996, pp. 125-130.
International Search Report from Application No. PCT/KR2018/011189 dated Feb. 28, 2019, 3 pages.
Jennings et al., "Advantages of Block Copolymer Synthesis by RAFT-Controlled Dispersion Polymerization in Supercritical Carbon Dioxide", Macromolecules, American Chemical Society, vol. 46, Aug. 2013, pp. 6843-6851.
Extended European Search Report with Written Opinion for Application No. 18862150.2 dated Aug. 4, 2020, 9 pages.

* cited by examiner

*Primary Examiner* — Robert D Harlan
(74) *Attorney, Agent, or Firm* — Lerner, David, Littenberg, Krumholz & Mentlik, LLP

(57) ABSTRACT

The present invention relates to a rubber composition having excellent tensile properties and viscoelasticity properties and including a modified conjugated diene-based polymer. The rubber composition may include a modified conjugated diene-based polymer which is selected considering target tensile properties and viscoelasticity properties, by predicting in advance the correlation of the modification ratio of the modified conjugated diene-based polymer and the dynamic viscoelasticity loss coefficient at 60° C. of the rubber composition through Mathematical Formula 1 and Mathematical Formula 2. Therefore, excellent compounding properties may be shown.

12 Claims, 2 Drawing Sheets

RUBBER COMPOSITION

CROSS-REFERENCE TO RELATED APPLICATIONS

The present application claims is a national phase entry under 35 U.S.C. § 371 of International Application No. PCT/KR2018/011189 filed Sep. 20, 2018, which claims priority from Korean Patent Application No. 10-2017-0126963 filed Sep. 29, 2017 and Korean Patent Application No. 10-2018-0112092 filed Sep. 19, 2018, all of which are incorporated herein by reference.

Technical Field

The present invention relates to a rubber composition having excellent processability and excellent tensile properties and viscoelasticity properties at the same time and including a modified conjugated diene-based polymer.

Background Art

Recently, according to the growing attention on energy saving and environmental issues, the decrease of the fuel consumption ratio of cars is required. As a method for accomplishing the requirement, a polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. It is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR rubber prepared by the solution polymerization is widely used as a rubber material for tires because it is easy to change a structure of the finally prepared SBR or BR rubber, and movement of chain terminals may be reduced and a coupling force with a filler such as silica and carbon black may be increased by coupling or modification of the chain terminals.

Meanwhile, in case where the conjugated diene-based polymer is modified, a modified part has a profound effect on compounding processability and physical properties through the interaction with an inorganic filler during preparing a rubber composition, and the effect is determined by the modification ratio of the conjugated diene-based polymer, i.e., the modified degree of the polymerization active part of the conjugated diene-based polymer. Thus, the modification ratio is used as an important index in determining the physical properties of a rubber composition.

DISCLOSURE OF THE INVENTION

Technical Problem

The present invention has been devised to solve the above-mentioned problems of the conventional technique, and an object of the present invention is to provide a rubber composition having excellent processability and excellent tensile properties and viscoelasticity properties at the same time and including a modified conjugated diene-based polymer.

Technical Solution

To solve the above-described tasks, there is provided a rubber composition including a modified conjugated diene-based polymer; a filler; and a vulcanizing agent, wherein the following Mathematical Formula 1 and Mathematical Formula 2 are satisfied:

$Y=AX+0.1645$ [Mathematical Formula 1]

$0.0945 \leq Y \leq 0.1561$ [Mathematical Formula 2]

in Mathematical Formula 1 and Mathematical Formula 2, A is a real number of −0.0019 to −0.0009, X is a modification ratio of the modified conjugated diene-based polymer, and Y is a dynamic viscoelasticity loss coefficient (tan δ) at 60° C. of the rubber composition.

Advantageous Effects

The rubber composition according to the present invention includes a modified conjugated diene-based polymer, wherein the modified conjugated diene-based polymer has a modification ratio satisfying Mathematical Formula 1 and Mathematical Formula 2, thereby achieving excellent tensile properties and viscoelasticity properties.

In addition, the rubber composition of the present invention may include a modified conjugated diene-based polymer which is selected considering target tensile properties and viscoelasticity properties, by predicting in advance the correlation of the modification ratio of the modified conjugated diene-based polymer and the dynamic viscoelasticity loss coefficient at 60° C. of the rubber composition through Mathematical Formula 1 and Mathematical Formula 2. Therefore, excellent compounding properties may be shown.

Also, the rubber composition of the present invention satisfies Mathematical Formula 1 and Mathematical Formula 2, and may have excellent processability and excellent tensile properties and viscoelasticity properties at the same time.

BRIEF DESCRIPTION OF THE DRAWINGS

The accompanying drawings attached to the present disclosure illustrate preferred embodiments of the present invention, and are incorporated with the description of the present invention for further understanding of the present technical spirits. The present invention may, however, should not be construed as limited to the accompanying drawings.

BEST MODE FOR CARRYING OUT THE INVENTION

Hereinafter, the present invention will be described in more detail in order to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The present invention provides a rubber composition having excellent tensile properties and viscoelasticity properties and including a modified conjugated diene-based polymer.

The rubber composition according to an embodiment of the present invention includes a modified conjugated diene-based polymer; a filler; and a vulcanizing agent, wherein the following Mathematical Formula 1 and Mathematical Formula 2 are satisfied:

$$Y=AX+0.1645 \quad \text{[Mathematical Formula 1]}$$

$$0.0945 \leq Y \leq 0.1561 \quad \text{[Mathematical Formula 2]}$$

In Mathematical Formula 1 and Mathematical Formula 2, A is a real number of −0.0019 to −0.0009, X is a modification ratio of the modified conjugated diene-based polymer, and Y is a dynamic viscoelasticity loss coefficient (tan δ) at 60° C. of the rubber composition.

Particularly in the above, Y may be a real number of 0.095 to 0.15.

The rubber composition according to an embodiment of the present invention may include a modified conjugated diene-based polymer of which modification ratio is controlled in accordance with target tensile properties and viscoelasticity properties, by predicting in advance the correlation of the modification ratio of the modified conjugated diene-based polymer and the dynamic viscoelasticity loss coefficient at 60° C. of the rubber composition through Mathematical Formula 1 and Mathematical Formula 2. Therefore, excellent compounding properties may be shown.

In addition, since the correlation of the modification ratio of the modified conjugated diene-based polymer and the dynamic viscoelasticity loss coefficient at 60° C. of the rubber composition may be predicted in advance through Mathematical Formula 1 and Mathematical Formula 2, the modified degree of the polymer may be comprehended in advance in line with the required physical properties during preparing the modified conjugated diene-based polymer, and valid information for selecting a modifier, etc. during preparing the modified conjugated diene-based polymer may be provided.

Figure 1:
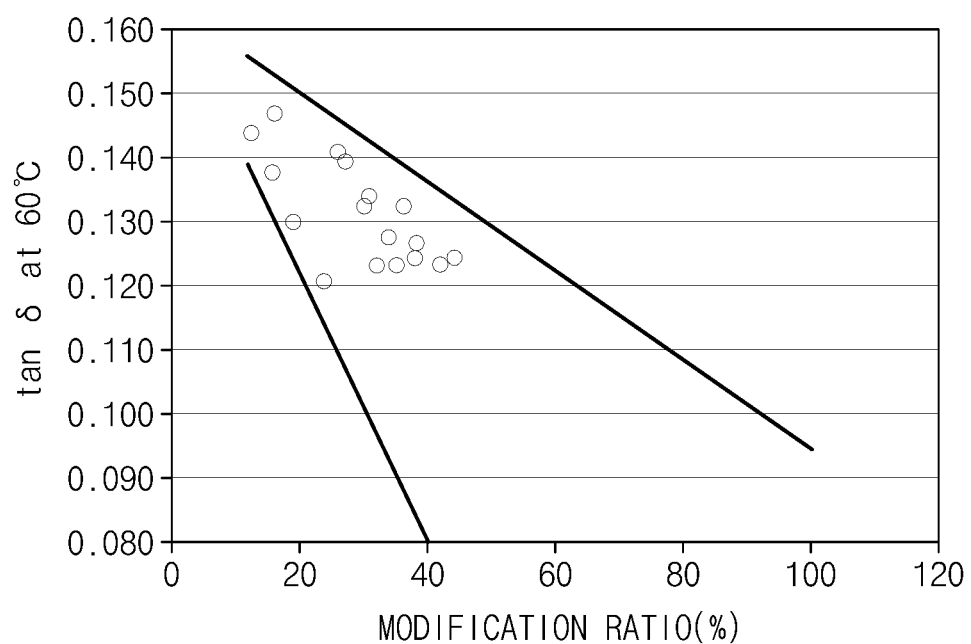
FIG. 1 is a graph showing the correlation of a dynamic viscoelasticity loss coefficient at 60° C. and the modification ratio of a modified conjugated diene-based polymer according to an embodiment of the present invention.

In the present invention, Mathematical Formula 1 is a regression equation derived by preparing 17 kinds of modified conjugated diene-based polymers having different modification ratios, measuring dynamic viscoelasticity loss coefficient at 60° C. using rubber compositions including the polymers, respectively, and making a comparison graph of the modified conjugated diene-based polymers and the dynamic viscoelasticity loss coefficient values (see FIG. 1).

In addition, in Mathematical Formula 2 in the present invention, the Y value represents the range of the dynamic viscoelasticity loss coefficient at 60° C. of the rubber composition, and if the above-mentioned range is satisfied, the tensile properties and the viscoelasticity properties of the rubber composition may be excellent in balance.

In an embodiment of the present invention, the modified conjugated diene-based polymer may be a conjugated diene-based polymer catalyzed with a lanthanide rare earth element-containing catalyst and including a functional group in at least one terminal, particularly, a modified polymer including a functional group in at least one terminal and/or a polymer chain, and may include a modified polymer unit including a functional group and an unmodified polymer unit not including the functional group. That is, the modified polymer unit and the unmodified polymer unit represent constituent units composing one polymer in the present invention, and the conjugated diene-based polymer may be composed of a modified polymer unit and an unmodified polymer unit.

Here, the functional group represents a functional group derived from a modifier and a group having affinity with a filler, and the modifier may be selected from commonly known materials in this field according to the polymer and modification object, for example, may include one or more functional groups selected from an azacyclopropane group, a ketone group, a carboxyl group, a thiocarboxyl group, a carbonate, a carboxylic acid anhydride, a metal carboxylate, an oxyhalide, a urea group, a thiourea group, an amide group, a thioamide group, an isocyanate group, a thioisocyanate group, a halogenated isocyano group, an epoxy group, a thioepoxy group, an imine group and a M-Z bond (where M is selected from Sn, Si, Ge and P, and Z is a halogen atom), and may be a compound not including an active proton and an onium salt. Accordingly, the functional group may have a wide selection.

In addition, the conjugated diene-based polymer catalyzed with the lanthanide rare earth element may represent a conjugated diene-based polymer derived from a catalyst composition including a lanthanide rare earth element-containing compound, i.e., a conjugated diene-based polymer including an activated organometal part derived from a catalyst, and may be prepared by polymerizing a conjugated diene-based monomer in the presence of the catalyst composition. Here, the conjugated diene-based polymer may be a butadiene homopolymer such as polybutadiene, or a butadiene copolymer such as a butadiene-isoprene copolymer.

In a particular embodiment, the conjugated diene-based polymer may include 80 to 100 wt % of a repeating unit derived from a 1,3-butadiene based monomer, and selectively 20 wt % or less of a repeating unit derived from other conjugated diene-based monomer which is copolymerizable with 1,3-butadiene monomer. Within the above-mentioned ranges, effect of not decreasing the 1,4-cis bond content in a polymer may be achieved. In this case, the 1,3-butadiene may include 1,3-butadiene or the derivatives thereof such as 2,3-dimethyl-1,3-butadiene, and 2-ethyl-1,3-butadiene. The other conjugated diene-based monomer which is copolymerizable with 1,3-butadiene may include 2-methyl-1,3-pentadiene, 1,3-pentadiene, 3-methyl-1,3-pentadiene, 4-methyl-1,3-pentadiene, 1,3-hexadiene or 2,4-hexadiene, and any one among the compounds or a compound of two or more thereof may be used.

According to an embodiment of the present invention, the conjugated diene-based polymer may particularly be a butadiene-based polymer catalyzed with neodymium, including a repeating unit derived from a 1,3-butadiene monomer.

In the present invention, the activated organometal part of the conjugated diene-based polymer may be an activated organometal part at the terminal of the conjugated diene-based polymer (activated organometal part at the terminal of a molecular chain), an activated organometal part in a main chain, or an activated organometal part in a side chain. Among them, in case where an activated organometal part of a conjugated diene-based polymer is obtained by anionic polymerization or coordination anionic polymerization, the activated organometal part may be an activated organometal part at the terminal.

Meanwhile, the catalyst composition may include a lanthanide rare earth element-containing compound, an alkylating agent, and a halogen compound.

As the lanthanide rare earth element-containing compound, any one used for the preparation of a common conjugated diene-based polymer may be used, without specific limitation. For example, the lanthanide rare earth element-containing compound may be a compound including one or two or more rare earth metals of atomic numbers of 57 to 71 such as lanthanum, neodymium, cerium, gadolinium and praseodymium, and more particularly, a compound including one or two or more selected from the group consisting of neodymium, lanthanum and gadolinium, may be used.

In addition, the lanthanide rare earth element-containing compound may be rare earth metal-containing carboxylates (for example, neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, neodymium neodecanoate, etc.), organic phosphates (for example, neodymium dibutyl phosphate, neodymium dipentyl phosphate, neodymium dihexyl phosphate, neodymium diheptyl phosphate, neodymium dioctyl phosphate, neodymium bis(1-methyl heptyl) phosphate, neodymium bis(2-ethylhexyl) phosphate, neodymium didecyl phosphate, etc.), organic phosphonates (for example, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, etc.), organic phosphinates (for example, neodymium butyl phosphinate, neodymium pentyl phosphinate, neodymium hexyl phosphinate, neodymium heptyl phosphinate, neodymium octyl phosphinate, neodymium (1-methyl heptyl) phosphinate, neodymium (2-ethylhexyl) phosphinate, etc.), carbamates (for example, neodymium dimethyl carbamate, neodymium diethyl carbamate, neodymium diisopropyl carbamate, neodymium dibutyl carbamate, neodymium dibenzyl carbamate, etc.), dithio carbamates (for example, neodymium dimethyldithio carbamate, neodymium diethyldithio carbamate, neodymium diisopropyl dithio carbamate, neodymium dibutyldithio carbamate, etc.), xanthogenates (for example, neodymium methyl xanthogenate, neodymium ethyl xanthogenate, neodymium isopropyl xanthogenate, neodymium butyl xanthogenate, neodymium benzyl xanthogenate, etc.), β-diketonates (for example, neodymium acetylacetonate, neodymium trifluoroacetyl acetonate, neodymium hexafluoroacetyl acetonate, neodymium benzoyl acetonate, etc.), alkoxides or allyloxides (for example, neodymium methoxide, neodymium ethoxide, neodymium isopropoxide, neodymium phenoxide, neodymium nonyl phenoxide, etc.), halides or pseudo halides (neodymium fluoride, neodymium chloride, neodymium bromide, neodymium idodide, neodymium cyanide, neodymium cyanate, neodymium thiocyanate, neodymium azide, etc.), oxyhalides (for example, neodymium oxyfluoride, neodymium oxychloride, neodymium oxybromide, etc.), or organic lanthanide rare earth element-containing compounds including one or more rare earth metal-carbon bonds (for example, $Cp_3Ln$, $Cp_2LnR$, $Cp_2LnCl$, $CpLnCl_2$, $CpLn$ (cyclooctatetraene), $(C_5Me_5)_2LnR$, $LnR_3$, $Ln(allyl)_3$, $Ln(allyl)_2Cl$, etc., where Ln is a rare earth metal element, and R is a hydrocarbyl group as defined above), etc. and may include any one or a mixture of two or more thereof.

Particularly, the lanthanide rare earth element-containing compound may be any one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$, or a mixture of two or more thereof. In addition, in consideration of excellent solubility in a polymerization solvent without fear of oligomerization, excellent conversion ratio into catalytically active species and consequent improving effect of catalytic activity, the neodymium compound may be any one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$, or a mixture of two or more thereof.

The alkylating agent is soluble in a non-polar solvent, particularly, a non-polar hydrocarbon-based solvent, and may be an organometallic compound including a bond between a cationic metal such as metals in group 1, 2, or 3 with carbon, or a boron-containing compound. More particularly, the alkylating agent may be any one selected from the group consisting of an organoaluminum compound, an organomagnesium compound, and an organolithium compound, or a mixture of two or more thereof.

The organoaluminum compound may include dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride. In addition, the organoaluminum compound may be aluminoxanes. The aluminoxane may be prepared by reacting trihydrocarbyl aluminum-based compounds with water. More particularly, the aluminoxane may be methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane, and any one among them or a mixture of two or more thereof may be used.

The organomagnesium compound may include at least one magnesium-carbon bond and is a magnesium compound which may be dissolved in a non-polar solvent, particularly, a non-polar hydrocarbon-based solvent. Particularly, the organomagnesium compound may include an alkylmagnesium compound such as diethylmagnesium, di-n-propylmagnesium, diisopropylmagnesium, dibutylmagnesium, dihexylmagnesium, diphenylmagnesium and dibenzylmagnesium; a hydrocarbyl magnesium hydride such as methyl magnesium hydride, ethyl magnesium hydride, butyl magnesium hydride, hexyl magnesium hydride, phenyl magnesium hydride, and benzyl magnesium hydride; a hydrocarbyl magnesium halide such as methyl magnesium chloride, ethyl magnesium chloride, butyl magnesium chloride, hexyl magnesium chloride, phenyl magnesium chloride, benzyl magnesium chloride, methyl magnesium bromide, ethyl magnesium bromide, butyl magnesium bromide, hexyl magnesium bromide, phenyl magnesium bromide, and benzyl magnesium bromide; a hydrocarbyl magnesium carboxylate such as methyl magnesium hexanoate, ethyl magnesium hexanoate, butyl magnesium hexanoate, hexyl magnesium hexanoate, phenyl magnesium hexanoate, and benzyl magnesium hexanoate; a hydrocarbyl magnesium alkoxide such as methyl magnesium ethoxide, ethyl magnesium ethoxide, butyl magnesium ethoxide, hexyl magnesium ethoxide, phenyl magnesium ethoxide, and benzyl magnesium ethoxide; or a hydrocarbyl magnesium aryloxide such as methyl magnesium phenoxide, ethyl magnesium phenoxide, butyl magnesium phenoxide, hexyl magnesium phenoxide, phenyl magnesium phenoxide, and benzyl magnesium phenoxide.

In addition, as the alkylating agent, an alkyl lithium of R—Li as an organolithium compound (in this case, R is an alkyl group of 1 to 20 carbon atoms, more particularly, a linear alkyl group of 1 to 8 carbon atoms) may be used. More particularly, methyllithium, ethyllithium, isopropyllithium, n-butyllithium, sec-butyllithium, t-butyllithium, isobutyllithium, pentyllithium, isopentyllithium, etc. may be used, and any one or a mixture of two or more thereof may be used.

The halogen compound may be a diatomic halogen, an interhalogen compound, a hydrogen halide, an organic halide, a nonmetal halide, a metal halide, or an organometal halide, etc., and any one or a mixture of two or more thereof may be used. Among them, in consideration of the improvement of catalytic activity and consequent improving effect of reactivity, the halogen compound may be one selected from the group consisting of an organic halide, a metal halide and an organometal halide, or a mixture of two or more thereof.

More particularly, the diatomic halogen may include fluorine, chlorine, bromine, or iodine.

The interhalogen compound may particularly include iodine monochloride, iodine monobromide, iodine trichloride, iodine pentafluoride, iodine monofluoride, iodine trifluoride, etc.

In addition, the hydrogen halide may particularly include hydrogen fluoride, hydrogen chloride, hydrogen bromide, or hydrogen iodide.

In addition, the organic halide may particularly include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may particularly include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride (SiCl$_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphorus triiodide, phosphorus oxyiodide or selenium tetraiodide.

Also, the metal halide may particularly include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

Also, the organometal halide may particularly include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

The catalyst composition according to an embodiment of the present invention may further include a diene-based monomer in addition to the above-described components.

The diene-based monomer may be mixed with a catalyst for polymerization and form a premixing type catalyst, or may be polymerized with components in a catalyst for polymerization, specifically with an alkylating agent such as DIBAH to form a preforming type catalyst. In case of performing such preforming polymerization, catalytic activity may be improved, and a conjugated diene-based polymer thus prepared may be further stabilized.

Particularly, as the diene-based monomer, any one used for the preparation of a common conjugated diene-based polymer may be used, without specific limitation.

Particularly, the diene-based monomer may be 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, or the like, and any one among them or a mixture of two or more thereof may be used.

The catalyst composition according to an embodiment of the present invention may further include a hydrocarbon-based solvent in addition to the above-mentioned components.

The hydrocarbon-based solvent may particularly be a non-polar solvent which has no reactivity with the components constituting the catalyst. Particularly, linear, branched or circular aliphatic hydrocarbon of 5 to 20 carbon atoms, such as n-pentane, n-hexane, n-heptane, n-octane, n-nonane, n-decane, isopentane, isohexane, isoheptane, isooctane, 2,2-dimethylbutane, cyclopentane, cyclohexane, methylcyclopentane and methylcyclohexane; a mixture solvent of aliphatic hydrocarbon of 5 to 20 carbon atoms, such as petroleum ether, petroleum spirits, and kerosene; or an aromatic hydrocarbon-based solvent such as benzene, toluene, ethylbenzene, and xylene, and any one or a mixture of two or more thereof may be used. More particularly, the non-polar solvent may be the linear, branched or circular aliphatic hydrocarbon of 5 to 20 carbon atoms, or the mixture solvent of the aliphatic hydrocarbon, and more particularly, n-hexane, cyclohexane, or a mixture thereof may be used.

In an embodiment of the present invention, the modification ratio is a value calculated by the following Mathematical Formula 3 using a chromatogram obtained by chromatography measurement, wherein the chromatography measurement is characterized in including: dissolving a polymer including a modified polymer unit and an unmodified polymer unit in a first solvent to prepare a first solution; injecting the first solution into a column filled with an adsorbent; adsorbing the modified polymer unit onto the adsorbent and eluting the first solution in which the unmodified polymer unit is dissolved; transporting the eluted first solution to a detector; injecting a second solvent into the column to elute a second solution in which the adsorbed modified polymer unit is dissolved; and transporting the eluted second solution to the detector:

$$\text{modification ratio (\%)} = \frac{\text{peak area of modified polymer}}{\text{peak area of unmodified polymer} + \text{peak are of modified polymer}} \times 100 \quad \text{[Mathematical Formula 3]}$$

In Mathematical Formula 3, the peak area of the unmodified polymer unit is the peak area of chromatogram with respect to the first solution transported to the detector, and the peak area of the modified polymer unit is the peak area of chromatogram with respect to the second solution transported to the detector.

In the present invention, the modification ratio may mean, for example, the ratio of a modified polymer with respect to an unmodified polymer when a polymer including a polymerization active part is modified with a modifier, and may be represented by percentage (%) with respect to the total of the modified polymer and the unmodified polymer.

In the present invention, the column may be a column used for chromatography, for example, a normal phase column of which stationary phase is polar and mobile phase is non-polar, or a reverse phase column of which stationary phase is non-polar and mobile phase is polar.

The adsorbent according to an embodiment of the present invention means the stationary phase of the column, and may be a filler filling the column. The adsorbent may be appropriately selected according to a modified part by the modifier. The adsorbent may be one selected from the group consisting of a silica-based adsorbent, a polymer-based adsorbent, an alumina ($Al_2O_3$) adsorbent, a graphitized carbon adsorbent and a zirconia adsorbent, particularly, a silica-based adsorbent. In this case, the adsorption of diverse modified polymers may be favorable.

The silica-based adsorbent may be, for example, one or more selected from the group consisting of a silica gel adsorbent derived from silica ($SiO_2$); and an adsorbent obtained by substituting the silanol group (Si—OH) at the surface of the silica gel with, or by end-capping with one or more derived units selected from the group consisting of a chain-type, branch-type or cyclic alkylsilane of 1 to 30 carbon atoms, an arylsilane of 5 to 30 carbon atoms, a chain-type, branch-type or cyclic alkylcyanosilane of 1 to 30 carbon atoms, and a chain-type, branch-type or cyclic aminoalkylsilane of 1 to 30 carbon atoms, particularly, one or more selected from the group consisting of a silica gel adsorbent; and an end-capping adsorbent with one or more derived units selected from the group consisting of trimethylsilane, ethyl(dimethyl)silane, propyl(dimethyl)silane, butyl(dimethyl)silane, octyl(dimethyl)silane, decyl(dimethyl)silane, octadecyl(dimethyl)silane, cyanopropyl(dimethyl)silane, aminopropyl(dimethyl)silane and 4-phenylbutyl(dimethyl)silane.

The adsorbent may, for example, have a particle size of 0.001 to 100 μm, 1 to 100 μm, 1 to 50 μm, or 3 to 30 μm, and within this range, the adsorption of a modified polymer may be favorable. The particle size may mean an average particle diameter according to the shape of the adsorbent, particularly, if the shape of the adsorbent is spherical or elliptical, the particle size may mean an average particle diameter with respect to the diameter or the major axis. If the adsorbent has a polyhedron shape, the particle size may mean an average particle diameter with respect to the major axis.

Meanwhile, in the measurement method of the modification ratio of the conjugated diene-based polymer according to an embodiment of the present invention, different adsorbents may be applied in accordance with the modified polymers. Particularly, the modified polymer according to an embodiment of the present invention may include a functional group including an amine group in at least one terminal, and in this case, the adsorbent may be a silica-based adsorbent which is substituted with the functional group including an amine group.

According to an embodiment of the present invention, the first solvent and the second solvent may be each independently a polar solvent or a non-polar solvent. Particularly, if the first solvent is a polar solvent, the second solvent may be a non-polar solvent, and if the first solvent is a non-polar solvent, the second solvent may be a polar solvent, and in this case, effects of more efficiently eluting the unmodified polymer from the first solution and the modified polymer from the second solution, respectively, may be achieved.

In another embodiment, the first solvent and the second solvent may be each independently a polar solvent having different polarity. Particularly, if the first solvent is a polar solvent having high polarity, the second solvent may be a polar solvent having low polarity, and if the first solvent is a polar solvent having low polarity, the second solvent may be a polar solvent having high polarity. The polarity is not represented by an absolute value but may be relative concept in accordance with the polarity of a polar solvent used as each of the first solvent and the second solvent. In this case, effects of more efficiently eluting the unmodified polymer from the first solution and the modified polymer from the second solution, respectively, may be achieved.

The polar solvent may be used in chromatography and may be any polar solvent that is capable of dissolving a modified polymer and an unmodified polymer, without limitation. For example, one or more selected from the group consisting of water, methanol, ethanol, n-propanol, n-butanol, isopropanol, formic acid, acetic acid, acetone, nitromethane, propylene carbonate, 1,2-dioxane, 1,3-dioxane, 1,4-dioxane, tetrahydrofuran (THF), acetonitrile (MeCN), dimethylformamide (DMF), dimethyl sulfoxide (DMSO), methyl ethyl ketone, benzonitrile, pyridine, nitroethane, benzyl alcohol, methoxy ethanol and formamide, may be used.

The non-polar solvent may be used in chromatography and may be any non-polar solvent that is capable of dissolving a modified polymer and an unmodified polymer, without limitation. For example, one or more selected from the group consisting of hexane, benzene, toluene, diethyl ether, chloroform, ethyl acetate, dichloromethane, cyclohexane, tetrachloromethane, iso-octane, xylene, butyl ether, isopropyl ether, and ethylene chloride, may be used.

According to an embodiment of the present invention, the first solution may be injected in a flow rate of 0.01 to 10.0 ml/min, or 0.5 to 2.0 ml/min, and within this range, the entire quantity of the modified polymer may be more efficiently adsorbed onto the adsorbent, and only the unmodified polymer may be eluted together with the first solution.

According to an embodiment of the present invention, the second solvent may be injected in a flow rate of 0.01 to 10.0 ml/min, or 0.5 to 2.0 ml/min, and within this range, effects of more efficiently eluting the second solution in which the modified polymer adsorbed onto the adsorbent is dissolved, may be achieved.

In addition, the first solution and the second solution may be controlled for easy elution of the unmodified polymer or the second solution within the above-mentioned ranges according to the volume of each column (the length or diameter of the column).

According to an embodiment of the present invention, the second solvent may be injected after eluting the entire quantity of the unmodified polymer. The point when the entire quantity of the unmodified polymer is eluted may mean a point when the signal of the unmodified polymer is not detected any more from a detector. In another embodiment, the second solvent may be injected into the column to which the first solution has been injected after finishing the injection of the first solution. Particularly, the second solvent may be continuously injected into the column to which the first solution has been injected according to a gradient elution by which the composition of a solvent is continuously changed. In this case, effects of more accurate detection without losing signals during the detection may be achieved.

Figure 2:
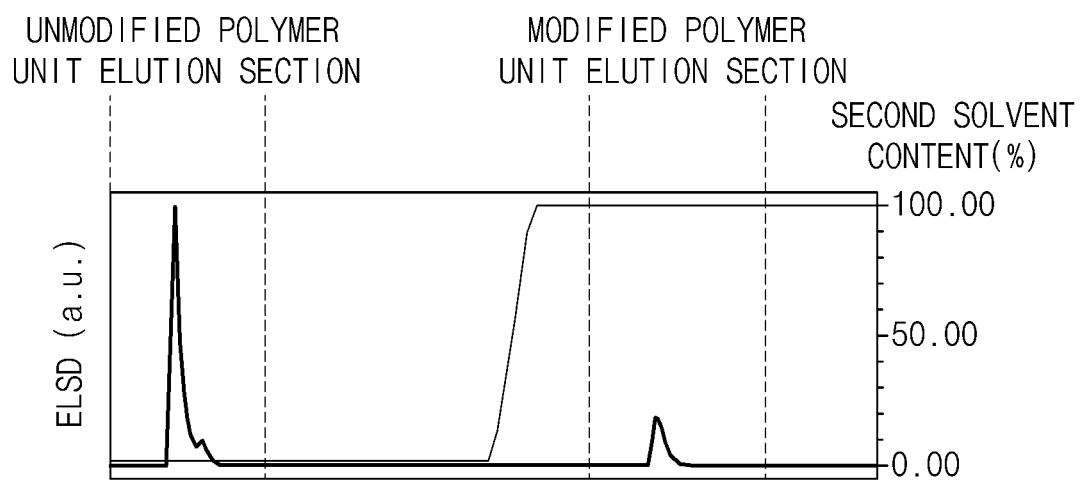
FIG. 2 is a chromatogram showing detection solution change in accordance with the injection of a second solvent in the measurement method of a modification ratio according to an embodiment of the present invention.

According to an embodiment of the present invention, if the second solvent is continuously injected according to the gradient elution into the column to which the first solution has been injected, the first solution and the second solution may be eluted at the same time from the injection point of the second solvent, and the eluted first solution and second solution at the same time may be transported to the detector at the same time. In addition, with respect to the quantity of 100 vol % of the first solution and the second solution transported to the detector, the quantity of the first solution and the second solution may gradually increase or decrease according to the injection rate of the second solvent from the injection point of the second solvent, respectively, that is, the first solution may gradually decrease from 100 vol % to 0 vol % and the second solution may gradually increase from 0 vol % to 100 vol %. In a particular embodiment, from the injection point of the second solvent, the first solution and the second solution may be detected in the detector at the same time, and according to the injection of the second solvent, the detection amount of the previously injected first solution may decrease from 100 vol % to 0 vol %, and the detection amount of the second solution may increase from 0 vol % to 100 vol % by the decreased detection amount of the first solution. After completing the elution of the first solution, only the second solution may be detected (see FIG. 2).

According to an embodiment of the present invention, the measurement method of the modification ratio of the conjugated diene-based polymer is conducted using a chromatography measurement apparatus, for example, a liquid chromatography measurement apparatus, particularly, a chromatography measurement apparatus including a mobile phase reservoir for storing a first solution and a second solvent, a pump for constantly and reproducibly supplying a mobile phase to a column, a sample injector for controlling the injection volume of a solution into the column or the injection volume of a solvent, a column for separating a modified polymer and an unmodified polymer, and a detector for detecting eluted modified polymer or unmodified polymer.

The mobile phase reservoir may be two or more, particularly, a mobile phase reservoir for storing the first solution and a mobile phase reservoir for storing the second solvent may be respectively provided. In addition, the mobile phase reservoir may include a separate gradient elution apparatus for the application of gradient elution.

For example, the pump may generate a pressure of 0.1 to 10,000 psi or 100 to 5,000 psi, may control a flow rate to 0.01 to 20 ml or 0.1 to 10 ml, may generate no pulse during supplying a solution or a solvent, and may keep a flow rate change of 1% or less, or 0.1 to 0.5%. In another embodiment, the pump may be a single-head pump or a dual-head pump, particularly, a dual-head pump, and in this case, the application of gradient elution may be favorable.

The injector may be, for example, a Rheodyne injector or an automatic injector, and the Rheodyne injector may have, for example, a loop volume of 1 to 500 µl, 5 to 200 µl, or 10 to 100 µl, and within this range, injection accuracy may be high.

The detector, for example, may be selected from a UV/Vis detector, a fluorescence detector, a refractive index detector and an evaporative light scattering detector, particularly, an evaporative light scattering detector. In this case, a response factor may be constant, accurate component analysis may be possible without making an analytical calibration curve based on a standard material, detection by gradient elution may be possible, and separation performance and separation sensitivity are excellent.

In an embodiment of the present invention, a modification ratio was measured using an evaporative light scattering detector (ELSD) of Waters Co. as the detector and injecting a specimen prepared in 1.0 mg/ml with a loop volume of 100 µl.

In addition, in an embodiment of the present invention, the dynamic viscoelasticity loss coefficient (tan δ) is used as the index of a fuel consumption ratio. If the dynamic viscoelasticity loss coefficient value at 60° C. decreases, hysteresis loss may decrease, rotational resistance properties may be improved, and thus, a fuel consumption ratio may be improved.

In the present invention, the dynamic viscoelasticity loss coefficient was measured by obtaining a specimen through vulcanizing a rubber composition at 150° C. for 90 minutes, and measuring using a dynamic mechanical analyzer of TA Co. with a twist mode and a frequency of 10 Hz, at a strain ratio of 3% at 60° C.

In addition, the rubber composition according to an embodiment of the present invention may include the modified conjugated diene-based polymer in an amount of 0.1 wt % to 100 wt %, particularly, 10 wt % to 100 wt %, more particularly, 20 wt % to 90 wt %. If the amount of the modified conjugated diene-based polymer is less than 0.1 wt %, the improving effects of the abrasion resistance and crack resistance of a molded article manufactured using the rubber composition, for example, a tire may be insignificant.

In addition, the rubber composition may further include other rubber components in addition to the modified conjugated diene-based polymer as necessary, and in this case, the rubber component may be included in an amount of 90 wt % or less with respect to the total weight of the rubber composition. Particularly, the rubber component may be included in an amount of 1 part by weight to 900 parts by weight with respect to 100 parts by weight of the modified conjugated diene-based polymer.

The rubber component may be a natural rubber or a synthetic rubber, for example, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, and a halogenated butyl rubber, and any one or a mixture of two or more thereof may be used.

In addition, the rubber composition may include 0.1 parts by weight to 150 parts by weight of a filler with respect to 100 parts by weight of the modified conjugated diene-based polymer, and the filler may be silica-based, carbon black or a combination thereof. Particularly, the filler may be carbon black.

The carbon black filler is not specifically limited but may have a nitrogen adsorption specific surface area of, for example, 20 $m^2/g$ to 250 $m^2/g$ (measured based on $N_2SA$, JIS K 6217-2:2001). Also, the carbon black may have a dibutylphthalate oil absorption amount (DBP) of 80 cc/100 g to 200 cc/100 g. If the nitrogen adsorption specific surface area of the carbon black is greater than 250 $m^2/g$, the processability of a rubber composition may be deteriorated, and if the nitrogen adsorption specific surface area of the carbon black is less than 20 $m^2/g$, reinforcing performance by the carbon black may be insignificant. In addition, if the DBP oil absorption amount of the carbon black is greater than 200 cc/100 g, the processability of the rubber composition may be deteriorated, and if the DBP oil absorption amount of the carbon black is less than 80 cc/100 g, reinforcing performance by the carbon black may be insignificant.

In addition, the silica is not specifically limited, but may include, for example, wet silica (hydrated silica), dry silica (anhydrous silicate), calcium silicate, aluminum silicate or colloid silica. Particularly, the silica may be wet silica which has the most remarkable compatibility effect of the improving effect of destruction characteristics and wet grip. In addition, the silica may have nitrogen absorption specific surface area (nitrogen surface area per gram, $N_2SA$) of 120 $m^2/g$ to 180 $m^2/g$, and cetyl trimethyl ammonium bromide (CTAB) absorption specific surface area of 100 $m^2/g$ to 200 $m^2/g$. If the nitrogen absorption specific surface area of the silica is less than 120 $m^2/g$, the reinforcing performance due to silica may be deteriorated, and if the nitrogen absorption specific surface area of the silica is greater than 180 $m^2/g$, the processability of the rubber composition may be deteriorated. In addition, if the CTAB absorption specific surface area of the silica is less than 100 $m^2/g$, the reinforcing performance by the silica filler may be deteriorated, and if the CTAB absorption specific surface area of the silica is greater than 200 $m^2/g$, the processability of the rubber composition may be deteriorated.

Meanwhile, if the silica is used as the filler, a silane coupling agent may be used together for the improvement of reinforcing and low exothermic properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or a mixture of two or more thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, the rubber composition according to an embodiment of the present invention may be sulfur cross-linkable, and so may further include a vulcanizing agent. The vulcanizing agent may be particularly a sulfur powder and may be included in an amount of 0.1 parts by weight to 10 parts by weight with respect to 100 parts by weight of the rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, a thermoplastic resin, or the like.

The vulcanization accelerator is not specifically limited, and may particularly include thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG). The vulcanization accelerator may be included in an amount of 0.1 parts by weight to 5 parts by weight with respect to 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less with respect to 100 parts by weight of the rubber component. With the above-described amount range, the deterioration of the tensile strength and low exothermic properties (low fuel consumption ratio) of a vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight with respect to 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low exothermic properties and excellent abrasion resistance may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Hereinafter, the present invention will be explained in particular referring to embodiments. However, the embodiments below are only for illustrating the present invention, and the scope of the present invention is not limited thereto.

PREPARATION EXAMPLE 1

Preparation of Catalyst Composition 1

To a hexane solvent under nitrogen conditions, a neodymium carboxylic acid compound was added and diisobutylaluminum hydride (DIBAH) and diethylaluminum chloride (DEAC) were added thereto one by one so that the molar ratio of neodymium compound:DIBAH:DEAC=1:10:2.4 was satisfied, followed by mixing to prepare a catalyst composition. The catalyst composition thus prepared was readily used or used after storing under nitrogen conditions at −10° C.

PREPARATION EXAMPLE 2

Preparation of ethyl 1-(trimethylsilyl)piperidine-4-carboxylate

To a solution obtained by dissolving 2 g of ethyl piperidine-4-carboxylate in dichloromethane ($CH_2Cl_2$), 1.77 ml of triethylamine ($Et_3N$) and 1.62 ml of trimethylsilyl chloride ($TMSCl_3$) were added at 0° C., followed by stirring for hours. Then, solvents were evaporated from the product solution under a reduced pressure, and the resultant product was re-dissolved in hexane and filtered to obtain 1-(trimethylsilyl)piperidine-4-carboxylate, and this compound was identified by $^1H$ nuclear magnetic resonance spectroscopic spectrum.

$^1H$ NMR (500 MHz, $CDCl_3$) δ 4.11-4.08 (m, 2H), 3.13-3.11 (m, 2H), 2.61-2.54 (m, 2H), 2.34-2.32 (m, 1H), 1.74 (m, 2H), 1.42 (m, 2H), 1.23-1.22 (m, 3H), 0.05-0.00 (m, 9H).

PREPARATION EXAMPLE 3

By controlling a modifier, a catalyst composition and reaction conditions, terminal modified butadiene polymers with different modification ratios were prepared.

To a completely dried reactor, vacuum and nitrogen were alternately applied. To the reactor in vacuum, 4.7 kg of a mixture solution of 1,3-butadiene/hexane(1,3-butadiene content=500 g) was added, the catalyst composition prepared in Preparation Example 1 was added, and polymerization reaction was performed at 60-90° C. for 15-60 minutes to prepare an active butadiene polymer including an activated aluminum part at the terminal.

Ethyl 1-(trimethylsilyl)piperidine-4-carboxylate prepared in Preparation Example 2 was injected thereto as a modifier and reacted at the same temperature conditions as the polymerization temperature for 30 to 60 minutes ([modifier]:[Nd]=1-10:1 eq). Then, a hexane solution including a polymerization quenching agent and a hexane solution including an antioxidant were added to finish the reaction.

The polymer thus obtained was added to hot water heated by steam, solvents were removed, and drying was performed to remove residual solvents and water to prepare a terminal modified butadiene polymer.

EXAMPLES 1 to 5

As shown in Table 1 below, a Y value and an A value were determined, a calculated X value was derived via Mathematical Formula 1, and each rubber composition was prepared using a terminal modified butadiene polymer having the X value.

Particularly, based on 100 parts by weight of the terminal modified butadiene polymer, 70 parts by weight of carbon black, 22.5 parts by weight of a process oil, 2 parts by weight of an antiaging agent (TMDQ), 3 parts by weight of zinc oxide (ZnO), and 2 parts by weight of stearic acid were mixed to prepare a first composition. To the first composition, 2 parts by weight of sulfur, 2 parts by weight of a vulcanization accelerator (CZ), and 0.5 parts by weight of a vulcanization accelerator (DPG) were added, followed by gently mixing at 50° C. for 1.5 minutes in 50 rpm to prepare each rubber composition.

Meanwhile, the terminal modified butadiene polymers were prepared through preparing a plurality of polymers by the method described in Preparation Example 3, and the modification ratio of each polymer was measured. A polymer having the calculated X value (rounding off the numbers to the first decimal places) was selected and used for the preparation of the rubber compositions of Examples 1 to 5.

$$Y = AX + 0.1645 \quad \text{[Mathematical Formula 1]}$$

In addition, the modification ratio (X value) of the terminal modified butadiene polymer was measured by a method explained below.

Each polymer was dissolved in cyclohexane and stored in each mobile phase reservoir of specimen (prepared in 1.0 mg/ml each), and tetrahydrofuran (THF) was stored in another mobile phase reservoir. The mobile phase reservoir was connected to a dual-head pump, and a solution of the mobile phase reservoir in which the polymer was dissolved was injected first into a column filled with a silica adsorbent through the pump and an injector having a loop volume of 100 µl. In this case, the pressure of the pump was 450 psi, and an injection rate was 0.7 ml/min. Then, after checking that an unmodified butadiene polymer unit in the polymer was not detected any more from a detector (ELSD, Waters Co.), based on 5 minutes from the initiation of the injection, the tetrahydrofuran was injected into the column through the pump. In this case, the pressure of the pump was 380 psi, and an injection rate was 0.7 ml/min. After checking that a modified butadiene polymer unit in the polymer was not detected any more from the detector according to the injection of tetrahydrofuran, the injection of the second solvent was finished. Then, from the detected chromatogram results, a modification ratio (%) was calculated according to the following Mathematical Formula 3:

$$\text{modification ratio (\%)} = \frac{\text{peak area of modified polymer}}{\text{peak area of unmodified polymer} + \text{peak are of modified polymer}} \times 100 \quad \text{[Mathematical Formula 3]}$$

TABLE 1

| Division | Y | A | X |
|---|---|---|---|
| Example 1 | 0.140 | −0.00091 | 27 |
| Example 2 | 0.120 | −0.0013 | 34 |
| Example 3 | 0.130 | −0.00099 | 35 |
| Example 4 | 0.130 | −0.0011 | 31 |
| Example 5 | 0.130 | −0.0019 | 18 |

COMPARATIVE EXAMPLES 1 to 3

Each rubber composition was prepared according to the same method as in Example 1, except for determining a Y value and an A value as shown in Table 2, deriving a calculated X value from Mathematical Formula 1, and using a terminal modified butadiene polymer having the X value. In this case, the Y value was the same as in Example 1, and the A value was determined as a value in a range deviated from a graph obtained by the rubber compositions of Comparative Examples 1 and 2 from Mathematical Formula 1 and Mathematical Formula 2.

In addition, the terminal modified butadiene polymers were prepared through preparing a plurality of polymers by the method described in Preparation Example 3, and the modification ratio of each polymer was measured. A polymer having the calculated X value was selected and used for the preparation of the rubber compositions of Comparative Examples 1 to 3, and the measurement of the modification ratio was performed by the same method as in Example 1.

TABLE 2

| Division | Y | A | X |
|---|---|---|---|
| Comparative Example 1 | 0.135 | −0.00211 | 14 |
| Comparative Example 2 | 0.120 | −0.00202 | 22 |
| Comparative Example 3 | 0.148 | −0.00083 | 20 |

EXPERIMENTAL EXAMPLES

Using the rubber composition prepared in each of the Examples and the Comparative Examples, a specimen was formed, and tensile properties, viscoelasticity properties and processability properties were measured and listed in Table 3 below.

Each specimen was formed by vulcanizing each rubber composition at 160° C. for 25 minutes.

1) Evaluation of Tensile Properties

The tensile properties of the specimen thus formed were measured after vulcanizing the specimen at 150° C. for t90 minutes, by measuring tensile stress, elongation (elongation ratio) when breaking the specimen, and tensile stress when elongated by 300% (300% modulus) according to an ASTM D412 tensile test method.

2) Evaluation of Viscoelasticity Properties

The viscoelasticity properties of the specimen thus formed were measured as a viscoelasticity coefficient (tan δ) at 60° C. using a dynamic mechanical analyzer of TA Co., Ltd. in a twist mode with a frequency of 10 Hz and a modification ratio of 3%. In the resultant values, if the tan δ value at 60° C. was decreased, hysteresis loss was decreased, and low rolling resistance (fuel efficiency) became good.

3) Processability Properties

Processability properties were compared and analyzed by measuring mooney viscosity (MV, (ML1+4 at 100° C.) MU) of each polymer and rubber composition. In this case, if the difference between the polymer mooney viscosity (PMV) and the rubber composition mooney viscosity (CMV) was decreased, processability properties became improved.

TABLE 3

| Division | Example | | | | | Comparative Example | | |
|---|---|---|---|---|---|---|---|---|
| | 1 | 2 | 3 | 4 | 5 | 1 | 2 | 3 |
| 300% modulus (kgf/cm²) | 96 | 114 | 112 | 112 | 109 | 90 | 103 | 91 |
| Tensile stress (kgf/cm²) | 186 | 184 | 182 | 190 | 183 | 174 | 175 | 185 |
| Elongation (%) | 494 | 437 | 443 | 453 | 514 | 484 | 439 | 499 |
| Tan δ at 60° C. | 0.139 | 0.123 | 0.127 | 0.128 | 0.130 | 0.135 | 0.118 | 0.148 |
| Polymer mooney viscosity (PMV) | 50.1 | 43 | 41 | 45 | 45 | 46 | 44 | 53 |
| Rubber composition mooney viscosity (CMV) | 87 | 65.3 | 75 | 65.7 | 73 | 88 | 95 | 98 |
| Mooney viscosity difference (CMV − PMV) | 36.9 | 22.3 | 34 | 20.7 | 28 | 42 | 51 | 45 |

As shown in Table 3, tan δ at 60° C. of each rubber composition of the Examples showed an equivalent value as each Y value shown in Table 1, and this means that the accuracy of Mathematical Formula 1 which is a regression equation showing the correlation of the modification ratio of the modified conjugated diene-based polymer according to the present invention and the dynamic viscoelasticity loss coefficient at 60° C. of the rubber composition, is high.

In addition, the rubber compositions of Examples 1 to 5 prepared to satisfy Mathematical Formula 1 and Mathematical Formula 2 according to the embodiments of the present invention, showed better tensile properties and viscoelasticity properties when compared with the rubber compositions of Comparative Example 1 to Comparative Example 3, which did not satisfy Mathematical Formula 1.

Particularly, the rubber compositions of Examples 1 to 5 according to the embodiments of the present invention, showed excellent processability and tensile properties, and thus, excellent mechanical properties. On the contrary, the processability properties were markedly degraded and tensile properties were degraded in Comparative Example 1 to Comparative Example 3. Through the above-mentioned results, the rubber composition according to the present invention used a modified conjugated diene-based polymer of which modification ratio was controlled so as to satisfy Mathematical Formula 1 and Mathematical Formula 2, and a rubber composition of which physical properties were controlled to fulfill target properties, was found to be easily prepared.

The invention claimed is:

1. A method for preparing a rubber composition comprising:
   determining a Y value by Mathematical Formula 2;
   calculating a X value according to Mathematical Formula 1;
   selecting a modified conjugated diene-based polymer having a modification ratio of the calculated X value, and
   mixing the modified conjugated diene-based polymer having a modification ratio of the calculated X value; a filler; and a vulcanizing agent, $$0.0945 \leq Y \leq 0.1561,$$ [Mathematical Formula 2]

$$Y = AX + 0.1645,$$ [Mathematical Formula 1]

wherein X is the modification ratio of the modified conjugated diene-based polymer, and the modification ratio is a ratio of a modified polymer with respect to an unmodified polymer when the unmodified polymer including a polymerization active part is modified with a modifier, A is a real number of −0.0019 to −0.0009, and Y is a dynamic viscoelasticity loss coefficient (tan δ) at 60° C. of the rubber composition.

2. The method according to claim 1, wherein the modified conjugated diene-based polymer having a modification ratio of the calculated X value is a conjugated diene-based polymer catalyzed with a lanthanide rare earth element-containing catalyst, and comprises a functional group in at least one terminal.

3. The method according to claim 1, wherein the modified conjugated diene-based polymer having a modification ratio of the calculated X value is included in an amount of 100 parts by weight; the filler is included in an amount of 0.1 parts by weight to 150 parts by weight; and the vulcanizing agent is included in an amount of 0.1 parts by weight to 10 parts by weight.

4. The method according to claim 1, wherein the modified conjugated diene-based polymer having a modification ratio of the calculated X value is selected based on a value calculated according to Mathematical Formula 3 using a chromatogram obtained by chromatography measurement,
   wherein the chromatography measurement is performed by a method comprising:
   dissolving a polymer comprising a modified polymer unit and an unmodified polymer unit in a first solvent to prepare a first solution;
   injecting the first solution into a column filled with an adsorbent;
   adsorbing the modified polymer unit onto the adsorbent and eluting the first solution in which the unmodified polymer unit is dissolved;
   transporting the eluted first solution to a detector;
   injecting a second solvent into the column to elute a second solution in which the adsorbed modified polymer unit is dissolved; and
   transporting the eluted second solution to the detector, $$\text{modification ratio (\%)} = \frac{\text{peak area of modified polymer}}{\text{peak area of unmodified polymer} + \text{peak are of modified polymer}} \times 100$$ [Mathematical Formula 3]

in Mathematical Formula 3,
the peak area of an unmodified polymer is the peak area of chromatogram with respect to the first solution transported to the detector, and the peak area of a modified polymer is the peak area of chromatogram with respect to the second solution transported to the detector, wherein the value calculated according to Mathematical Formula 3 is the modification ratio of the calculated X value.

5. The method according to claim 4, wherein the adsorbent is a silica-based adsorbent.

6. The method according to claim 4, wherein the first solvent and the second solvent are each independently a polar solvent or a non-polar solvent, wherein the first solvent and the second solvent have opposite polarities.

7. The method according to claim 6, wherein the polar solvent is one or more selected from the group consisting of water, methanol, ethanol, n-propanol, n-butanol, isopropanol, formic acid, acetic acid, acetone, nitromethane, propylene carbonate, 1,2-dioxane, 1,3-dioxane, 1,4-dioxane, tetrahydrofuran (THF), acetonitrile (MeCN), dimethylformamide (DMF), dimethylsulfoxide (DMSO), methyl ethyl ketone, benzonitrile, pyridine, nitroethane, benzyl alcohol, methoxy ethanol and formamide.

8. The method according to claim 6, wherein the non-polar solvent is one or more selected from the group consisting of hexane, benzene, toluene, diethyl ether, chloroform, ethyl acetate, dichloromethane, cyclohexane, tetrachloromethane, iso-octane, xylene, butyl ether, isopropyl ether and ethylene chloride.

9. The method according to claim 4, wherein the first solution is injected in a flow rate of 0.001 to 10.0 ml/min.

10. The method according to claim 4, wherein the second solvent is injected in a flow rate of 0.001 to 10.0 ml/min.

11. The method according to claim 4, wherein the second solvent is injected after eluting a total amount of the unmodified polymer unit.

12. The method according to claim 4, wherein the second solvent is continuously injected according to a gradient elution into the column into which the first solution has been injected.

* * * * *